United States Patent
Jang

(10) Patent No.: US 9,890,685 B2
(45) Date of Patent: Feb. 13, 2018

(54) METHOD OF DIAGNOSING FAILURE OF SCR SYSTEM

(71) Applicants: HYUNDAI MOTOR COMPANY, Seoul (KR); KIA MOTORS CORPORATION, Seoul (KR)

(72) Inventor: Hwa Yong Jang, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 97 days.

(21) Appl. No.: 14/928,438

(22) Filed: Oct. 30, 2015

(65) Prior Publication Data

US 2016/0376973 A1    Dec. 29, 2016

(30) Foreign Application Priority Data

Jun. 26, 2015    (KR) .................. 10-2015-0091359

(51) Int. Cl.
*F01N 3/00* (2006.01)
*F01N 11/00* (2006.01)
*F01N 3/20* (2006.01)

(52) U.S. Cl.
CPC .......... *F01N 11/007* (2013.01); *F01N 3/2066* (2013.01); *F01N 2550/05* (2013.01)

(58) Field of Classification Search
CPC ... F01N 11/007; F01N 3/2066; F01N 2550/05
USPC ........................................ 60/286
See application file for complete search history.

(56) References Cited

U.S. PATENT DOCUMENTS

| | | | | |
|---|---|---|---|---|
| 5,946,907 A * | 9/1999 | Nagaishi | ............... | F01N 3/2006 60/284 |
| 5,956,947 A * | 9/1999 | Tanaka | ............... | B01D 53/9495 60/274 |
| 6,289,673 B1 * | 9/2001 | Tayama | .............. | F02D 41/0295 60/274 |
| 7,543,443 B2 * | 6/2009 | Tsumagari | ......... | B01D 53/9409 60/274 |
| 7,854,161 B2 * | 12/2010 | Hjorsberg | ............. | F01N 3/2066 73/114.71 |
| 7,997,070 B2 * | 8/2011 | Yasui | ...................... | F01N 3/208 60/276 |
| 9,528,424 B2 * | 12/2016 | Aoki | ..................... | F01N 3/2066 |
| 2003/0046928 A1* | 3/2003 | van Nieuwstadt | ..... | B01D 53/90 60/286 |

(Continued)

FOREIGN PATENT DOCUMENTS

JP    2011-038521    2/2011
JP    2013-72391    4/2013

(Continued)

*Primary Examiner* — Phutthiwat Wongwian
*Assistant Examiner* — Matthew T Largi
(74) *Attorney, Agent, or Firm* — Brink Gilson & Lione

(57) ABSTRACT

The present disclosure provides a method of diagnosing a failure of a Selective Catalytic Reduction (SCR) system, the method including: injecting urea into the interior of an exhaust pipe using an injector; after the injection step, detecting an amount of NOx and an amount of ammonia through an NOx sensor provided at a rear end of the exhaust pipe; and diagnosing a failure of the injector based on at least one of the amount of NOx and the amount of ammonia.

9 Claims, 3 Drawing Sheets

(56) References Cited

U.S. PATENT DOCUMENTS

2007/0209349 A1* 9/2007 Ripper ............... B01D 53/9495
                                                    60/286
2010/0115918 A1* 5/2010 Sawada ................. B01D 53/30
                                                    60/276
2011/0040541 A1   2/2011 Van Den Eijnden et al.

FOREIGN PATENT DOCUMENTS

| KR | 10-0836338 B1   | 6/2008  |
| KR | 10-0907363 B1   | 7/2009  |
| KR | 10-2009-0123943 | 12/2009 |

* cited by examiner

METHOD OF DIAGNOSING FAILURE OF SCR SYSTEM

CROSS-REFERENCE TO RELATED APPLICATION

The present application claims the benefit of the Korean Patent Application No. 10-2015-0091359, filed Jun. 26, 2015, which is incorporated herein by reference in its entirety.

FIELD

The present disclosure relates to a method devised to diagnose a failure of an injector for injecting urea in a Selective Catalytic Reduction (SCR) system.

BACKGROUND

The statements in this section merely provide background information related to the present disclosure and may not constitute prior art.

Interests in a urea-selective catalytic reduction (urea-SCR) system that can effectively reduce nitrogen oxides (NOx) generated by a diesel engine have increased.

Such an SCR system relates to a technology using reactions of nitrogen oxides (NOx) and ammonia ($NH_3$), and if urea is injected into an exhaust pipe, urea is converted into ammonia ($NH_3$) through hydrolysis. The converted ammonia ($NH_3$) and nitrogen oxides (NOx) chemically react with each other on a catalyst and are converted into water and nitrogen which are not harmful to environments and humans.

Here, an injector functions to inject ammonia water into an exhaust pipe and nitrogen composites in exhaust gases are converted into nitrogen and water ($H_2O$) on an SCR catalyst through an oxidation/reduction reaction.

Then, an amount of injected urea is determined according to how long a current is applied to the injector. The hardware injection amount reference value of the injector may be determined when the injector is developed. However, we have discovered that the injector may inject an amount of urea that is smaller or excessively larger than a urea injection amount reference value through deterioration and repeated operations thereof as the injector is used, which may dissatisfy a reference intended in an SCR catalyst chemical reaction when the injector is developed. If an amount of urea smaller than a reference value is injected, the exhaust gas rules cannot be satisfied, and when urea is excessively injected, the urea that has not chemically reacted is discharged to a rear end of a muffler so that the muffler generates ammonia smells and contaminations.

SUMMARY

The present disclosure provides a method of detecting an amount of NOx using an NOx sensor provided at a rear end of an exhaust pipe, and diagnosing a failure of the injector due to aging of the injector based on a difference between a detected amount of NOx and a target amount mapped in advance.

In one aspect, the present disclosure provides a method of diagnosing a failure of an SCR system, the method including: injecting urea into the interior of an exhaust pipe using an injector; after the injection step, detecting an amount of NOx and an amount of ammonia through an NOx sensor provided at a rear end of the exhaust pipe; and diagnosing a failure of the injector based on at least one of the amount of NOx and the amount of ammonia.

In the diagnosis step, when the amount of NOx is more than a NOx reference value mapped in advance, or the amount of ammonia is more than an ammonia reference value mapped in advance, a failure of the injector is diagnosed.

When it is diagnosed that the injector fails, a failure signal is output to a diagnosis unit.

In the injection step, the injector is controlled to inject urea at a predetermined time interval, and the detection step is performed when a set time period elapses from a time point where the injector is controlled to inject urea.

In the injection step, the injector injects a larger amount of urea as time elapses.

The method further includes: a step of, before the injection step, receiving a diagnosis signal from a diagnosis unit by an electronic control unit; and a step of, after the receiving step, determining whether a diagnosis of the injector is possible by the electronic control unit, and when it is determined that the diagnosis of the injector is possible, performing the injection step.

In the determination step, when a revolution per minute (RPM) of the engine deviates from a predetermined range, it is determined that a diagnosis of the injector is impossible.

In the determination step, when the vehicle speed is higher than zero or an opening degree of an accelerator is larger than a predetermined angle, it is determined that the diagnosis is impossible.

In the determination step, when the exterior temperature deviates from a set temperature range, it is determined that a diagnosis of the injector is impossible.

In the determination step, when the temperature of cooling water deviates from a predetermined temperature range, it is determined that the diagnosis of the injector is impossible.

According to the method of diagnosing a failure of an SCR system having the above-mentioned structure, a failure of the injector can be easily detected by comparing the amount of nitrogen oxides and the amount of ammonia at the rear end of the exhaust pipe with the reference values, thereby detecting a urea superabundance or lack phenomenon in the interior of the exhaust pipe.

In addition, violation of the exhaust gas rules due to a failure of the injector can be prevented or ammonia smells or contaminations can be prevented from being generated at a rear end of the muffler of the vehicle.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
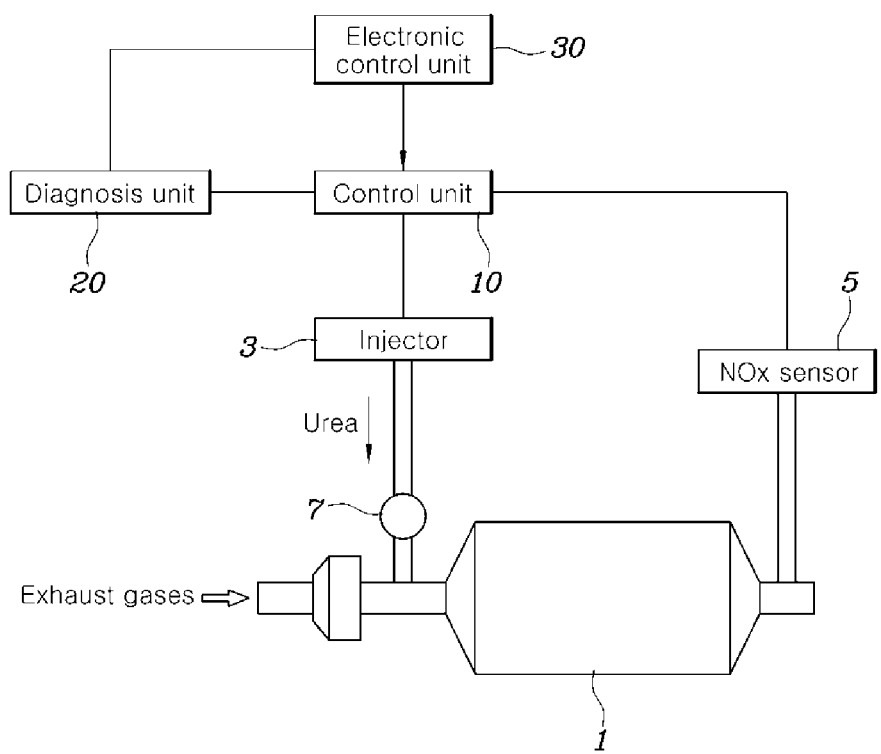
FIG. 1 is a view illustrating an apparatus for diagnosing a failure of an SCR system according to an embodiment of the present disclosure.

It should be understood that the appended drawings are not necessarily to scale, presenting a somewhat simplified representation of various preferred features of the present disclosure as disclosed herein, including, for example, specific dimensions, orientations, locations, and shapes will be determined in part by the particular intended application and use environment.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
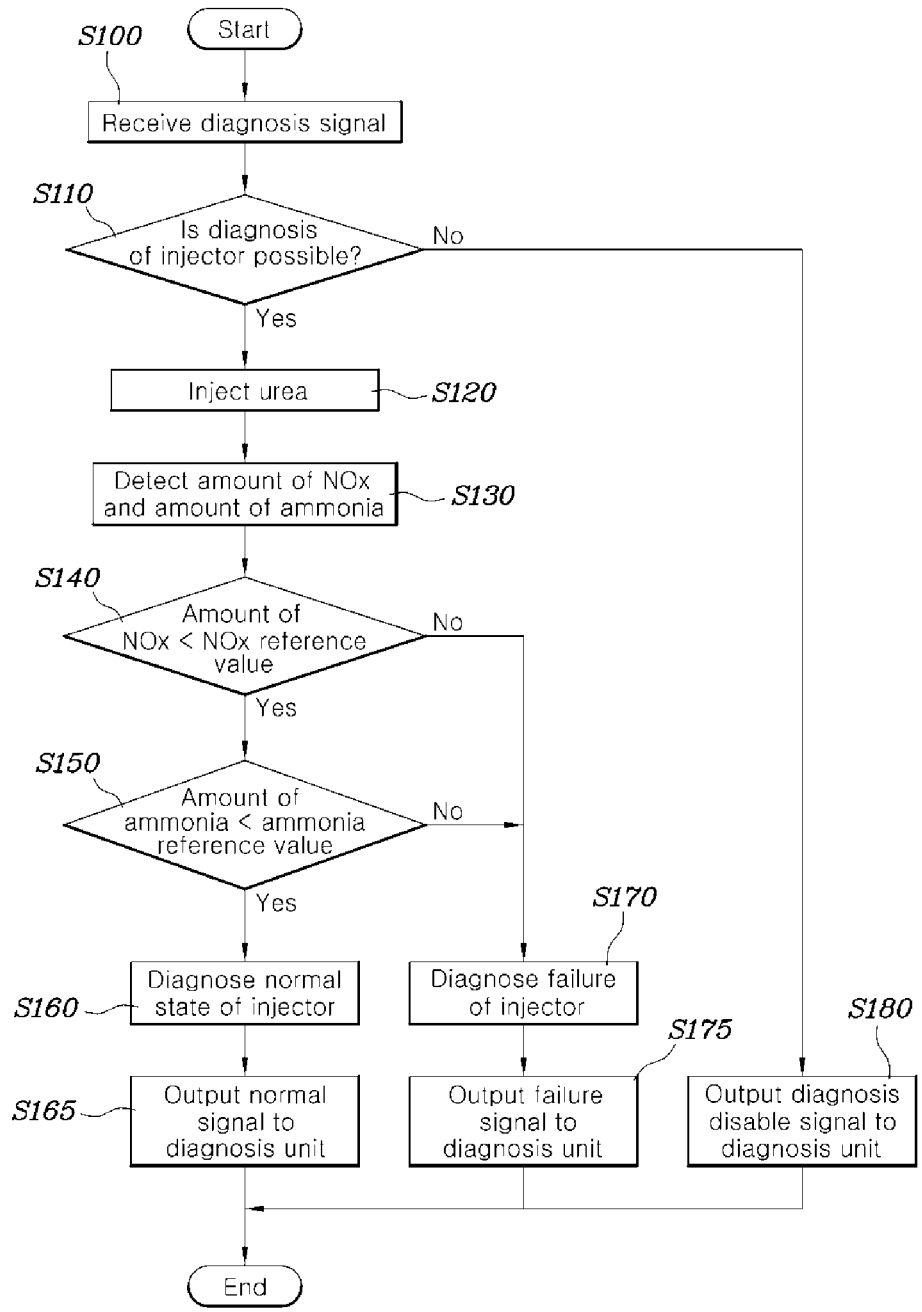
FIG. 2 is a flowchart illustrating a method of diagnosing a failure of an SCR system according to an embodiment of the present disclosure.
Figure 3:
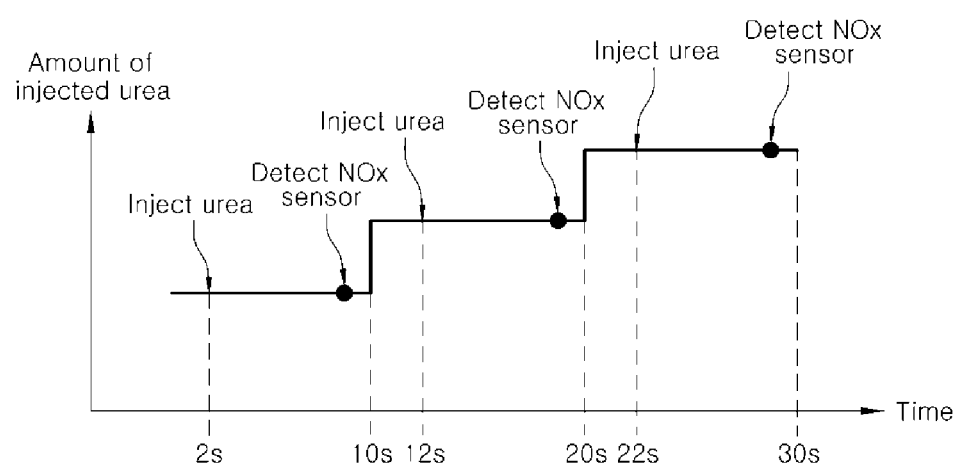
FIG. 3 is a graph depicting an injector failure diagnosis time point according to an embodiment of the present disclosure.

Referring to FIGS. 1 to 3, the method of diagnosing an SCR system may include a step S120 of injecting urea into an exhaust pipe 1 using an injector 3; a step of, after the injection step S120, detecting an amount of NOx and an amount of ammonia through an NOx sensor 5 provided at a rear end of the exhaust pipe 1; and a step S170 of diagnosing a failure of the injector 3 based on at least one of the amount of NOx and the amount of ammonia.

If the injector 3 injects urea into the exhaust pipe 1, ammonia is generated by hydrolysis, and ammonia and nitrogen oxides (NOx) contained in exhaust gases chemically react with each other in the interior of the exhaust pipe 1 and thus are converted into water and nitrogen that are not harmful to environments and humans.

When the injector 3 is normal, a proper amount of urea is injected, but if the injector 3 is aged, an amount of injected urea becomes smaller than or excessively larger than a reference amount, for example, due to deterioration of the injector 3. In order to detect a failure situation, a control unit 10 may detect an amount of NOx at a rear end of the exhaust pipe 1 where chemical reactions are completed using an NOx sensor 5, may calculate an amount of ammonia through an amount of NOx compared with an amount of the injected urea, and may detect characteristic values necessary for diagnosing a failure of the injector 3.

According to the diagnosis method, the exhaust gas rules may be observed and generation of ammonia smells and contaminations at the rear end of the muffler may be prevented by preventing urea from being injected less or excessively than adequate amount due to a failure of the injector 3.

In detail, when the amount of NOx is more than a NOx reference value mapped in advance S140 or the amount of ammonia is more than an ammonia reference value mapped in advance S150, a failure of the injector 3 is diagnosed.

The NOx reference value and the ammonia reference value mapped in advance are values mapped to an amount of NOx and an amount of ammonia formed in exhaust gases when the injector is normal. If the amount of NOx and the amount of ammonia measured by the NOx sensor 5 are the same as the reference values, the control unit 10 may determine that the injector 3 injects a proper amount of urea. Accordingly, a failure of the injector 3 may be diagnosed by comparing the amount of NOx and the amount of ammonia detected by the NOx sensor 5 with the reference values.

Here, the NOx reference value and the ammonia reference value mapped in advance may be provided such that the injector 3 is diagnosed only when a failure of the injector 3 is clear by adding a predetermined allowable amount to the amount of NOx and the amount of ammonia when the injector is normal. Then, the NOx reference value, the ammonia reference value, and the allowable amount may be differently set according to the vehicle and the designer.

For example, when the injector 3 injects urea excessively more than a target amount due to a failure situation, a large amount of ammonia ($NH_3$) is left at a rear end of the exhaust pipe 1 where a chemical reaction is completed. Accordingly, the amount of ammonia measured by the NOx sensor 5 exceeds the ammonia reference value, and thus a failure of the injector 3 may be diagnosed S140, S170. If the injector 3 injects urea less than a target amount due to a failure situation, a large amount of nitrogen oxides (NOx) that have not be eliminated are left at the rear end of the exhaust pipe 1. Accordingly, the amount of NOx measured by the NOx sensor 5 is more than the NOx reference value, and thus the control unit 10 may diagnose a failure situation of the injector 3 S170.

The control unit 10 outputs a failure signal to a diagnosis unit 20 when it is diagnosed that the injector 3 fails S175.

That is, when the injector 3 injects urea less than a target amount, the nitrogen oxides (NOx) are not eliminated so that the exhaust gas rules may be violated. In contrast, when the injector 3 injects urea excessively more than the target amount, ammonia ($NH_3$) is generated at the rear end of the exhaust pipe 1 so that the exhaust pipe of the vehicle may be contaminated or ammonia smells may be generated.

In order to prevent generation of the bad influence, the control unit 10 may output a failure signal to the diagnosis unit 20, and the diagnosis unit 20 may inform the driver or the repair person of the failure of the injector 3 using a display or a sound when receiving a failure signal.

In contrast, when diagnosing that the injector 3 is normal S160, the control unit 10 may output a normal signal to the diagnosis unit 20 S165. Accordingly, the driver or the repair person may recognize that the injector 3 is normal through the diagnosis unit 20.

Meanwhile, in the injection step S120, the injector 3 is controlled to inject urea at a predetermined time interval, and the detection step S130 is performed when a preset time period elapses from a time point where the injector 3 is injected.

In the injection step S120, a larger amount of urea is injected as time elapses.

Because the injector 3 always injects urea at the same pressure, the amount of injected urea increases or decreases according to a duty value by which a valve 7 of the injector 3 is opened.

For example, the injector 3 continues to supply urea at a pressure of about 5 bar, and because the valve 7 is opened at a predetermined time interval, urea may be supplied into the exhaust pipe 1. The injector 3 continues to supply urea at a predetermined pressure, and when the valve 7 is opened as time elapses, an amount of urea larger than the amount of urea supplied into the exhaust pipe 1 may be supplied to the exhaust pipe 1.

Referring to FIG. 3 that illustrates an embodiment, when two seconds elapses after the injector 3 starts to supply urea at a predetermined pressure, the valve 7 is opened and urea is supplied to the exhaust pipe 1. Thereafter, because the amount of NOx and the amount of ammonia at the rear end of the exhaust pipe 1 are detected using the NOx sensor 5 before 10 seconds elapse, a residual amount of nitrogen oxides and a residual amount of ammonia may be precisely recognized when a chemical reaction is completed. Thereafter, when 12 seconds elapse, the valve 7 is opened, and it can be seen that the amount of injected urea increases as compared with the previous amount of injected urea. Next, before 20 seconds elapse, precise data necessary when a failure of the injector 3 is diagnosed may be acquired by detecting the amount of NOx and the amount of ammonia using the NOx sensor 5 again.

The pressure at which the injector 3 supplies urea, the time period at which the valve 7 is opened, and the time period at which the NOx sensor 5 detects an amount of NOx are merely values according to an embodiment of the present disclosure, and may be varied and applied according to the vehicle and the designer.

Moreover, a step S100 of, before the injection step S120, receiving a diagnosis signal from the diagnosis unit 20 by an electronic control unit 30 S100; and a step S110 of, after the receiving step S100, determining whether the injector 3 may be diagnosed by the electronic control unit 30 are further provided, and when it is determined that the injector 3 may be diagnosed, the injection step S120 is performed.

That is, the diagnosis unit 20 may output a diagnosis signal when the driver or the repair person detects a failure of an SCR related component and manipulates a diagnosis mode of the diagnosis unit 20 for a precise diagnosis.

The electronic control unit (ECU) 30 that is a high level controller of the control unit 10 determines whether a failure of the injector 3 may be diagnosed when the corresponding diagnosis signal is received.

In detail, in the determination step S110, it is determined that a diagnosis is impossible when the RPM of the engine deviates from a predetermined range, when the vehicle speed is higher than 0 or an opening degree of the accelerator is larger than a preset angle, when the exterior temperature deviates from a set temperature range, or when the temperature of cooling water deviates from a predetermined temperature range.

That is, the electronic control unit 30 determines that the vehicle does not idle and a diagnosis of the injector 3 is impossible when the RPM of the engine deviates from a predetermined RPM range corresponding to an idle state. Furthermore, when the vehicle speed or an opening degree of the accelerator is not zero, the vehicle is not stopped and thus it is determined that the diagnosis of the injector 3 is impossible. In addition, when the exterior temperature or the cooling water temperature does not fall within a normal temperature range, it is determined that the diagnosis of the injector 3 is impossible. Accordingly, a diagnosis may be performed when the injector 3 can be precisely diagnosed.

As described above, when the electronic control unit 30 determines that the diagnosis of the injector 3 is impossible, the electronic control unit 30 outputs a diagnosis disable signal to the diagnosis unit 20 to allow the driver or the repair person to recognize a diagnosis disabled situation S180. In contrast, when the electronic control unit 30 determines that the injector 3 can be diagnosed, the control unit 10 performs a control to inject urea using the injector 3 S120.

The control unit 10 may be a dosing control unit (DCU), and the exhaust pipe 1 may be an SCR catalytic unit.

According to the method of diagnosing a failure of an SCR system having the above-mentioned structure, a failure of the injector may be easily detected by comparing the amount of nitrogen oxides and the amount of ammonia at the rear end of the exhaust pipe with the reference values, thereby detecting a urea superabundance or lack phenomenon in the interior of the exhaust pipe.

In addition, violation of the exhaust gas rules due to a failure of the injector may be prevented or ammonia smells or contaminations may be prevented from being generated at a rear end of the muffler of the vehicle.

The present disclosure has been described in detail with reference to preferred embodiments thereof. However, it will be appreciated by those skilled in the art that changes may be made in these embodiments without departing from the principles and spirit of the present disclosure, the scope of which is defined in the appended claims and their equivalents.

What is claimed is:

1. A method of diagnosing a failure of an SCR system, the method comprising:
    injecting urea into an interior of an exhaust pipe using an injector;
    after the injection step, detecting an amount of NOx and an amount of ammonia through an NOx sensor provided at a rear end of the exhaust pipe; and
    diagnosing a failure of the injector based on at least one of the amount of NOx and the amount of ammonia,
    wherein in the injecting step, the injector is controlled to inject urea at predetermined time intervals, and the detecting step is performed when a predetermined time period elapses from a time point where the injector is controlled to inject urea, and
    wherein in the injecting step, the injector is configured to inject a larger amount of urea than a previously injected amount of urea as time elapses.

2. The method according to claim 1, wherein in the diagnosing step, when the amount of NOx exceeds an NOx reference value mapped in advance, or when the amount of ammonia is more than an ammonia reference value mapped in advance, a failure of the injector is diagnosed.

3. The method according to claim 1, wherein when the failure of the injector is diagnosed, a failure signal is output.

4. The method according to claim 1, further comprising:
    a step of, before the injecting step, receiving a diagnosis signal by an electronic control unit; and
    after the receiving step, a step of determining whether a diagnosis of the injector is possible by the electronic control unit, and
    wherein when the diagnosis of the injector is possible, performing the injecting step.

5. The method according to claim 4, wherein in the determining step, when a revolution per minute (RPM) of an engine deviates from a predetermined range, determining that the diagnosis of the injector is impossible.

6. The method according to claim 4, wherein in the determining step, when a vehicle speed is higher than zero and an opening degree of an accelerator is larger than a predetermined angle, determining that the diagnosis of the injector is impossible.

7. The method according to claim 4, wherein in the determining step, when an exterior temperature deviates from a predetermined temperature range, determining that the diagnosis of the injector is impossible.

8. The method according to claim 4, wherein in the determining step, when a temperature of cooling water deviates from a predetermined temperature range, determining that the diagnosis of the injector is impossible.

9. The method according to claim 4, wherein the diagnosing a failure of the injector is determined based on the amount of NOx and the amount of ammonia.

* * * * *